(12) United States Patent
Kitamura (10) Patent No.: US 9,384,433 B2
(45) Date of Patent: Jul. 5, 2016

(54) IMAGE FORMING APPARATUS THAT PERFORMS COLOR MISREGISTRATION CORRECTION CONTROL CAUSED BY INCLINATION OF TRANSFER MEMBER

(71) Applicant: CANON KABUSHIKI KAISHA, Tokyo (JP)

(72) Inventor: Shingo Kitamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/713,764

(22) Filed: May 15, 2015

(65) Prior Publication Data

US 2015/0339557 A1 Nov. 26, 2015

(30) Foreign Application Priority Data

May 22, 2014 (JP) ................. 2014-106460

(51) Int. Cl.
| H04N 1/60 | (2006.01) |
| G03F 3/08 | (2006.01) |
| G06K 9/00 | (2006.01) |
| G06K 15/00 | (2006.01) |
| G06K 15/02 | (2006.01) |

(52) U.S. Cl.
CPC ........ *G06K 15/4055* (2013.01); *G06K 15/1878* (2013.01)

(58) Field of Classification Search
None
See application file for complete search history.

(56) References Cited

U.S. PATENT DOCUMENTS

| 5,589,858 | A | * | 12/1996 | Kadowaki | ................ B41J 11/42 347/117 |
| 8,023,873 | B2 | | 9/2011 | Nakatsu | |
| 8,547,599 | B2 | * | 10/2013 | Ido | ........................... H04N 1/58 358/1.9 |
| 8,804,216 | B2 | * | 8/2014 | Ito | ...................... G03G 15/5062 356/417 |
| 2006/0092264 | A1 | * | 5/2006 | Matsuzaki | ........... G03G 15/326 347/233 |
| 2006/0170936 | A1 | * | 8/2006 | Takehara | ........... G03G 15/0131 358/1.4 |
| 2006/0221358 | A1 | * | 10/2006 | Takahashi | .......... H04N 1/00432 358/1.1 |
| 2007/0165283 | A1 | * | 7/2007 | Matsuzaki | ........... G06K 15/128 358/3.26 |
| 2008/0174799 | A1 | * | 7/2008 | Higashiyama | ....... G06K 9/3275 358/1.9 |
| 2008/0253786 | A1 | * | 10/2008 | Isobe | ................. G03G 15/5004 399/69 |
| 2009/0073469 | A1 | * | 3/2009 | Kita | ................... G03G 15/5029 358/1.9 |
| 2009/0154944 | A1 | * | 6/2009 | Kawaguchi | ........ G03G 15/5062 399/49 |

(Continued)

FOREIGN PATENT DOCUMENTS

JP 2008-281833 A 11/2008

*Primary Examiner* — Madelein Nguyen
(74) *Attorney, Agent, or Firm* — Fitzpatrick, Cella, Harper & Scinto (57) ABSTRACT

An image forming apparatus includes: a transfer member that is driven to be rotated; an image forming unit configured to form an image on the transfer member; a detection unit configured to detect inclination of the transfer member relative to a rotation direction of the transfer member; and a control unit configured to perform correction control of color misregistration caused by the inclination of the transfer member when an image is formed by the image forming unit, based on the inclination of the transfer member. The control unit is further configured not to perform the correction control when a monochrome image is formed.

7 Claims, 6 Drawing Sheets

(56) References Cited

U.S. PATENT DOCUMENTS

| | | | |
|---|---|---|---|
| 2009/0201521 A1* | 8/2009 | Ooya | G03G 15/0142 358/1.9 |
| 2010/0097623 A1* | 4/2010 | Ooya | H04N 1/047 358/1.9 |
| 2010/0158568 A1* | 6/2010 | Yasumoto | G03G 15/0131 399/165 |
| 2010/0310284 A1* | 12/2010 | Funato | G01P 3/68 399/302 |
| 2012/0107009 A1* | 5/2012 | Yano | G03G 21/206 399/92 |
| 2012/0321328 A1* | 12/2012 | Nakazato | G03G 15/1615 399/18 |
| 2013/0038885 A1* | 2/2013 | Higashiyama | H04N 1/506 358/1.9 |
| 2013/0064579 A1* | 3/2013 | Takahashi | G03G 15/0131 399/301 |
| 2013/0141750 A1* | 6/2013 | Suzuki | G06K 15/408 358/1.14 |
| 2014/0125752 A1* | 5/2014 | Miyadera | G03G 15/0189 347/118 |
| 2015/0078792 A1* | 3/2015 | Aoyagi | G03G 15/1615 399/302 |

\* cited by examiner

IMAGE FORMING APPARATUS THAT PERFORMS COLOR MISREGISTRATION CORRECTION CONTROL CAUSED BY INCLINATION OF TRANSFER MEMBER

BACKGROUND OF THE INVENTION

1. Field of the Invention

The present disclosure relates to a correction technique of color misregistration caused by inclination of a transfer member.

2. Description of the Related Art

An image forming apparatus that transfers toner images, which are formed on photosensitive members of each color, on top of each other to an intermediate transfer belt to form a color image is known. The toner images of each color can be placed on top of each other at the same position when the intermediate transfer belt rotates without displacement in a main scanning direction orthogonal to the rotation direction, and an image with a little color misregistration can be formed. However, when there is displacement in the main scanning direction, the transfer position of the toner images of each color is shifted in the main scanning direction from an appropriate position, and color misregistration occurs. Therefore, Japanese Patent Laid-Open No. 2008-281833 discloses a configuration of detecting inclination of the intermediate transfer belt relative to the rotation direction and correcting a writing position on a photosensitive member based on a detected amount of inclination to reduce color misregistration.

To detect inclination of an intermediate transfer belt to perform color misregistration correction control caused by the inclination, a sensor that detects the inclination of the intermediate transfer belt needs to be activated. A reduction in the power consumption of the image forming apparatus is demanded, and the same applies to the power consumption in the color misregistration correction control caused by the inclination.

SUMMARY OF THE INVENTION

According to an aspect of the present invention, an image forming apparatus includes: a transfer member that is driven to be rotated; an image forming unit configured to form an image on the transfer member; a detection unit configured to detect inclination of the transfer member relative to a rotation direction of the transfer member; and a control unit configured to perform correction control of color misregistration caused by the inclination of the transfer member when an image is formed by the image forming unit, based on the inclination of the transfer member. The control unit is further configured not to perform the correction control when a monochrome image is formed.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings. The following embodiments are illustrative, and the present invention is not limited to the content of the embodiments. In the following drawings, constituent elements not necessary for the description of the embodiments are omitted from the drawings.

Figure 1:
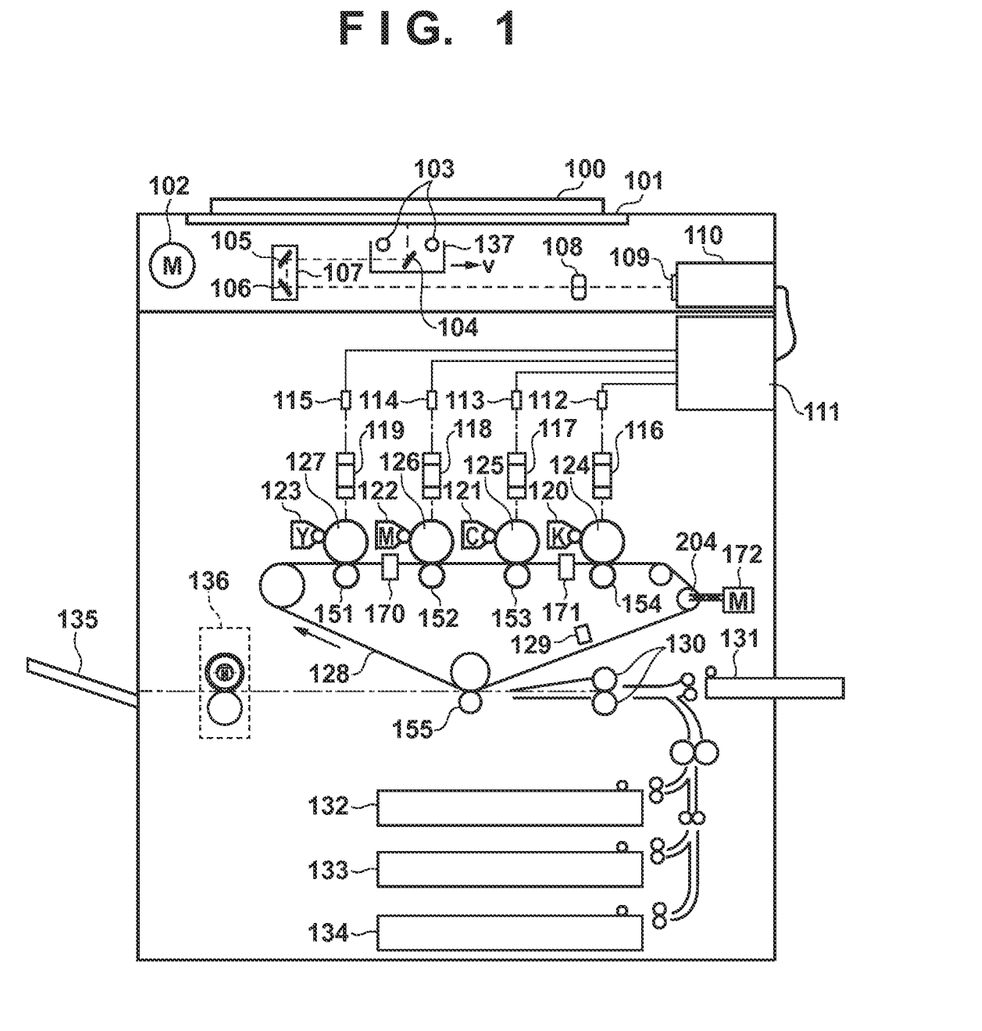
FIG. 1 is a configuration diagram of an image forming apparatus according to an embodiment.

FIG. 1 is a configuration diagram of an image forming apparatus according to the present embodiment. An original 100 to be copied is placed on an original platen 101. Light from light sources 103 is emitted to the original 100. A CCD 109 receives reflected light from the original 100 through mirrors 104, 105, and 106 and an optical system 108. The CCD 109 includes CCD line sensors of three lines of R (red), B (blue), and G (green). A motor 102 drives a first mirror unit 137 including the mirror 104 and the light sources 103 at a velocity V and drives a second mirror unit 107 including the mirrors 105 and 106 at a velocity 1/2V to thereby scan the entire surface of the original 100.

An image processing unit 110 processes image information read by the CCD 109 into an electrical signal and outputs a print signal to a printer control unit 111. Semiconductor lasers 112 to 115 are driven by an output signal from the printer control unit 111. Laser light from the semiconductor lasers scans surfaces of corresponding photosensitive members 124 to 127 by rotation of corresponding polygonal mirrors 116 to 119 to thereby form latent images on the surfaces of the photosensitive members. The photosensitive members 124 to 127 are driven to be rotated, and a charging roller (not shown) charges the photosensitive members 124 to 127 at a uniform potential on an upstream of an irradiation position of the laser light in the rotation direction. Developing devices 120, 121, 122, and 123 include black (K), cyan (C), magenta (M), and yellow (Y) toners, respectively, and develop latent images of the corresponding photosensitive members 124 to 127 by the toners to form toner images.

Primary transfer rollers 151 to 154 output a primary transfer bias and transfer the toner images formed on the corresponding photosensitive members to an intermediate transfer belt 128 that is an image carrier and a transfer member. The toner images formed on the photosensitive members are transferred on top of each other to form a multi-color toner image. The intermediate transfer belt 128 is driven to be rotated in a direction of an arrow in FIG. 1 and conveys the toner images transferred to the surface to an opposed position of a secondary transfer roller 155. Hereinafter, a direction orthogonal to the rotation direction of the intermediate transfer belt 128 will be called a main scanning direction. Among cassettes 132 to 134 and a manual feed tray 131, a sheet supplied from one of the cassettes and the manual feed tray selected by the user is conveyed on a conveyance path through registration rollers 130. The paper feed timing from one of the cassettes and the tray and the scan of the photosensitive members with the laser light are based on a synchronization signal generated by the printer control unit 111. Therefore, the paper feed timing of sheet and the image forming timing are synchronized. The secondary transfer roller 155 outputs a secondary transfer bias and transfers the toner images of the intermediate transfer belt 128 to the sheet conveyed through the conveyance path. After the transfer of the toner images, the sheet is conveyed to a fixing unit 136, and the transferred toner images are fixed to the sheet. After the fixing of the toner images, the sheet is discharged to a paper discharge tray 135. A photo-interrupter 129 is a sensor that detects a reference mark inside of the intermediate transfer belt 128 to detect a reference position of the intermediate transfer belt 128. End part sensors 170 and 171 that detect the position of an end part of the intermediate transfer belt 128 in the main scanning direction are provided at belt end parts of the intermediate transfer belt 128.

Figure 2A:
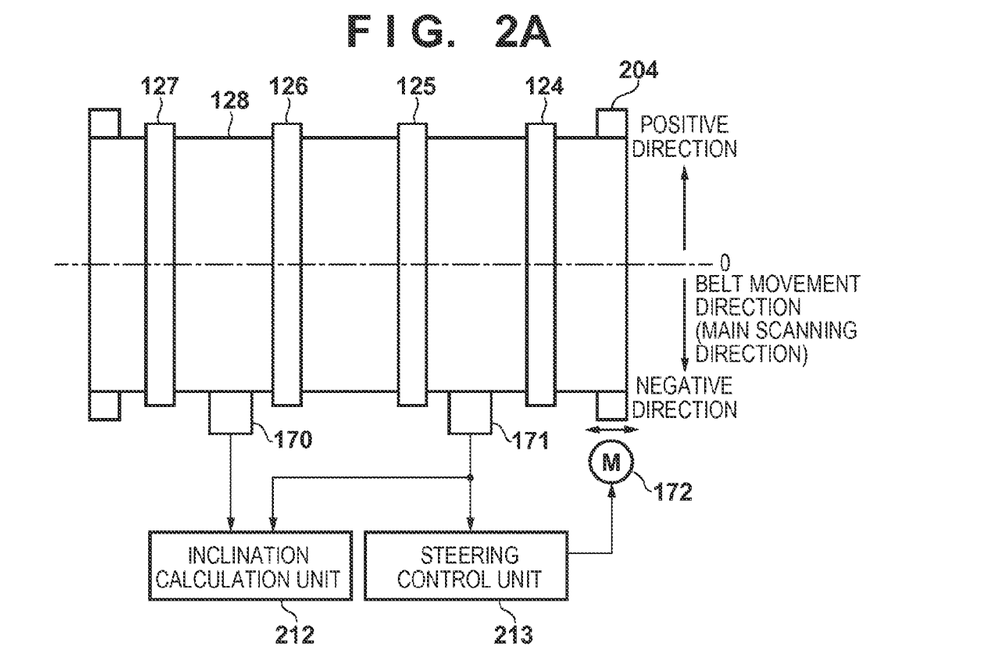
FIGS. 2A and 2B are explanatory diagrams of meandering correction of an intermediate transfer belt according to an embodiment.
Figure 2B:
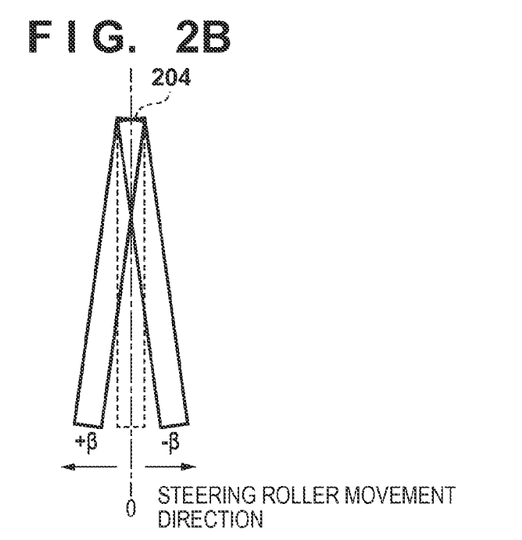

FIGS. 2A and 2B are explanatory diagrams of meandering correction of the intermediate transfer belt 128 by a steering motor 172. In the present embodiment, the end part sensor 171 detects the position of the end part of the intermediate transfer belt 128 in the main scanning direction, and a steering control unit 213 performs meandering correction of the intermediate transfer belt 128 based on a detection result of the end part sensor 171. For example, when a movement of the belt in a positive direction of FIG. 2A is detected, the steering control unit 213 causes the steering motor 172 to move a steering roller 204 in a +β direction of FIG. 2B to thereby move the intermediate transfer belt 128 in a negative direction. On the other hand, when a movement in the negative direction of FIG. 2A is detected, the steering control unit 213 causes the steering motor 172 to move the steering roller 204 in a −β direction of FIG. 2B to thereby move the intermediate transfer belt 128 in the positive direction. The steering control unit 213 controls steering to prevent the intermediate transfer belt 128 from being moved too much. Based on detection results of the end part sensors 170 and 171, the inclination calculation unit 212 detects inclination of the intermediate transfer belt 128 in the main scanning direction relative to the rotation direction. The steering control unit 213 and the inclination calculation unit 212 are provided in, for example, the printer control unit 111.

Figure 3A:
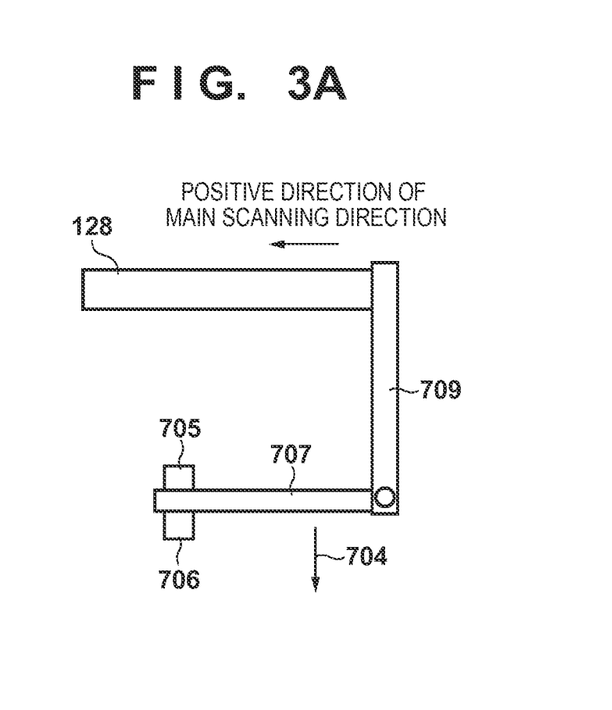
FIGS. 3A and 3B are explanatory diagrams of end part sensors according to an embodiment.

FIGS. 3A and 3B are explanatory diagrams of detection of the position of the belt end part in the main scanning direction by the end part sensors 170 and 171. As shown in FIG. 3A, a flag 709 of the end part sensor is abutted to an end surface of the intermediate transfer belt 128. The end part sensors include two photodiodes 705 and 706, and the relationships between the amount of received light and the output voltage of the photodiodes 705 and 706 are substantially the same. The end part sensors also include light emitting elements (not shown), and the photodiodes 705 and 706 receive the light emitted by the light emitting elements. A sensor surface flag 707 is connected to the flag 709, and the sensor surface flag 707 is configured to block part of the light from the light emitting elements to the photodiodes 705 and 706. When the sensor surface flag 707 is at a reference position, the intensities of light received by the photodiodes 705 and 706 at the emission of light by the light emitting elements are substantially the same.

Figure 3B:
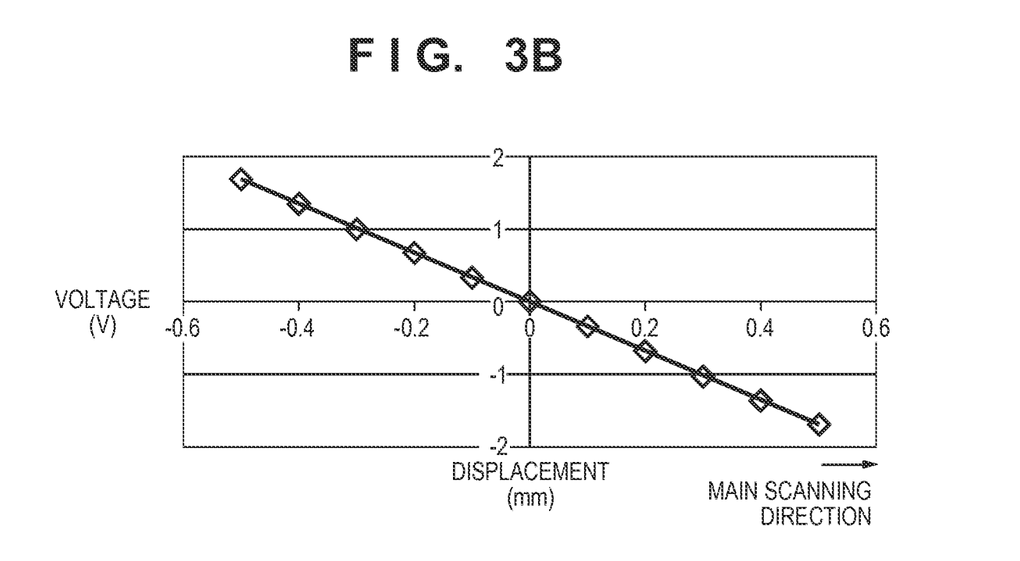

For example, when the intermediate transfer belt 128 moves in the positive direction of the main scanning direction, and thus the flag 709 moves in the same direction accordingly, the sensor surface flag 707 moves in a direction of an arrow 704. As a result, the received light intensity of the photodiode 706 decreases, and the received light intensity of the photodiode 705 increases. On the other hand, when the intermediate transfer belt 128 moves in the negative direction of the main scanning direction, and thus the flag 709 moves in the same direction accordingly, the sensor surface flag 707 moves in the opposite direction of the arrow 704. As a result, the received light intensity of the photodiode 705 decreases, and the received light intensity of the photodiode 706 increases. Therefore, the position of the belt in the main scanning direction can be detected by, for example, dividing the output voltage of the photodiode 706 by the output voltage of the photodiode 705. FIG. 3B shows a relationship between the position of the belt end part in the main scanning direction and the value obtained by dividing the output voltage of the photodiode 706 by the output voltage of the photodiode 705. The abscissa is indicated by displacement from the reference position of the belt end part.

Figure 4A:
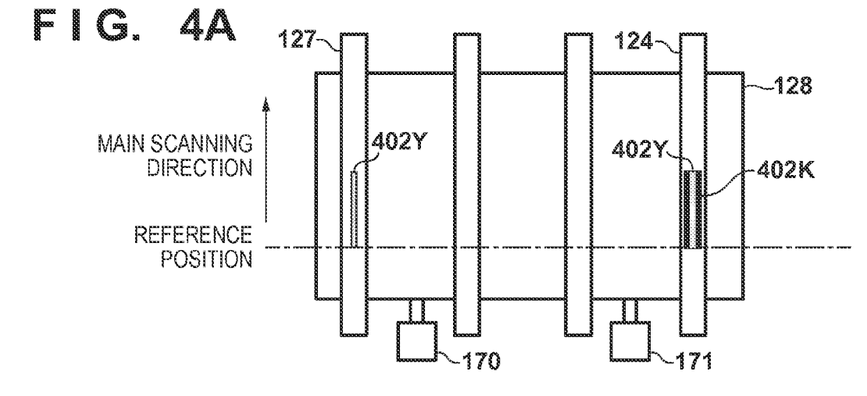
FIGS. 4A to 4C are explanatory diagrams of color misregistration correction control caused by inclination of the intermediate transfer belt relative to a rotation direction according to an embodiment.
Figure 4B:
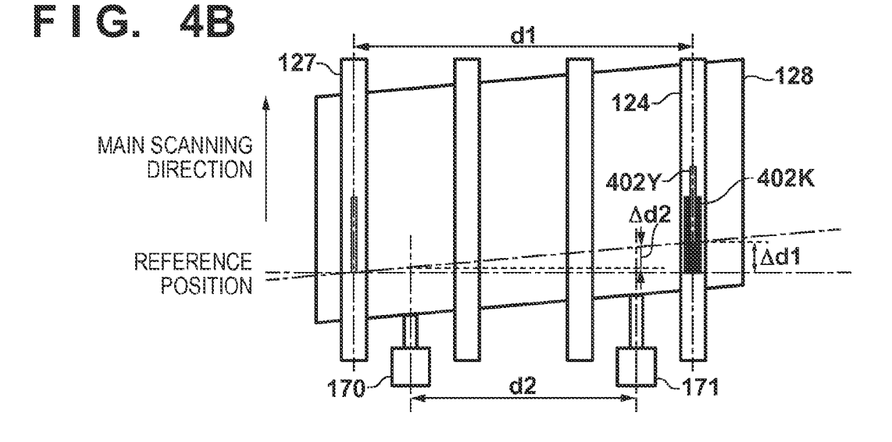
Figure 4C:
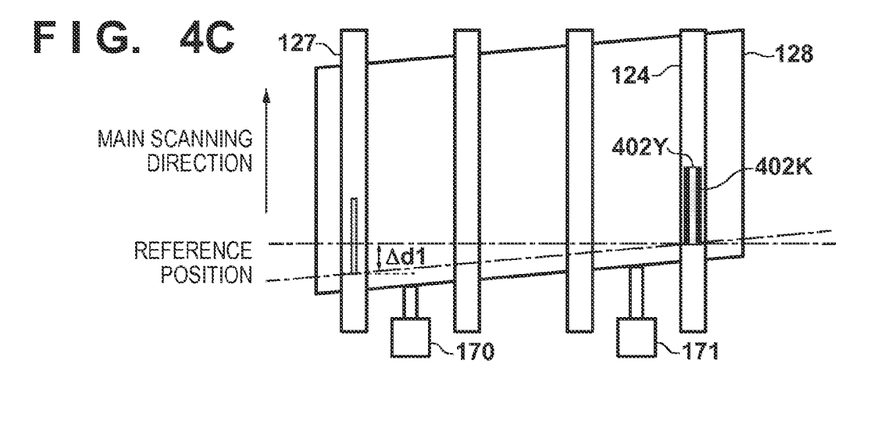

FIGS. 4A to 4C are explanatory diagrams of color misregistration caused by inclination of the intermediate transfer belt 128 in the main scanning direction and the color misregistration correction control according to the present embodiment. FIG. 4A illustrates a case in which there is no inclination of the intermediate transfer belt 128 relative to the rotation direction. The photosensitive member 127 transfers a yellow toner image 402Y to the intermediate transfer belt 128. The toner image 402Y is conveyed to the transfer position of the photosensitive member 124 by the rotation of the intermediate transfer belt 128, and the toner image 402Y and a black toner image 402K transferred by the photosensitive member 124 are placed on top of each other. There is no relative misregistration in the main scanning direction between the toner image 402Y and the toner image 402K transferred to the intermediate transfer belt 128.

FIG. 4B illustrates a case in which the intermediate transfer belt 128 is inclined relative to the rotation direction. Here, an amount of deviation of the transfer position of the photosensitive member 124 in the main scanning direction based on the transfer position of the photosensitive member 127 is Δd1. In this case, as shown in FIG. 4B, the toner image 402Y transferred to the intermediate transfer belt 128 is shifted by Δd1 to the positive side of the main scanning direction relative to the toner image 402K. Therefore, as shown in FIG. 4C, the formation position of the toner image on the photosensitive member 127 can be shifted by Δd1 to the negative side of the main scanning direction in this case to suppress the color misregistration of the toner image 402Y and the toner image 402K. As shown in FIG. 4B, the distance between the end part sensors 170 and 171 is d2, and the belt position detected by the end part sensor 171 is shifted by Δd2 to the positive side of the main scanning direction relative to the belt position detected by the end part sensor 170. In this case, the amount of deviation Δd1 can be obtained by Δd1=d1×Δd2/d2. Although the color misregistration correction of the yellow and black toner images is described in FIGS. 4A to 4C, the same applies to other colors.

When a monochrome image is formed, there is no relative color misregistration between colors in the first place. Therefore, there is no need to detect inclination of the intermediate transfer belt 128 relative to the rotation direction to correct the writing position on the photosensitive member when a monochrome image is formed. More specifically, when the image formation mode is monochrome, the end part sensor 171 needs to detect the belt position to correct meandering of the intermediate transfer belt 128, but the end part sensor 170 does not have to detect the belt position. The power consumption of the light emitting elements of the end part sensors is relatively large. Therefore, the power to the end part sensor 170 is turned off to reduce the power consumption in the present embodiment when a monochrome image is formed. The printer control unit 111 further stops the operation of a color misregistration correction unit, including the inclination calculation unit 212 and the like, that performs the color misregistration correction control caused by the inclination of the intermediate transfer belt 128 when a monochrome image is formed. The printer control unit 111 activates a meandering correction unit, including the steering control unit 213 and the like, that corrects meandering even when a monochrome image is formed.

Figure 5:
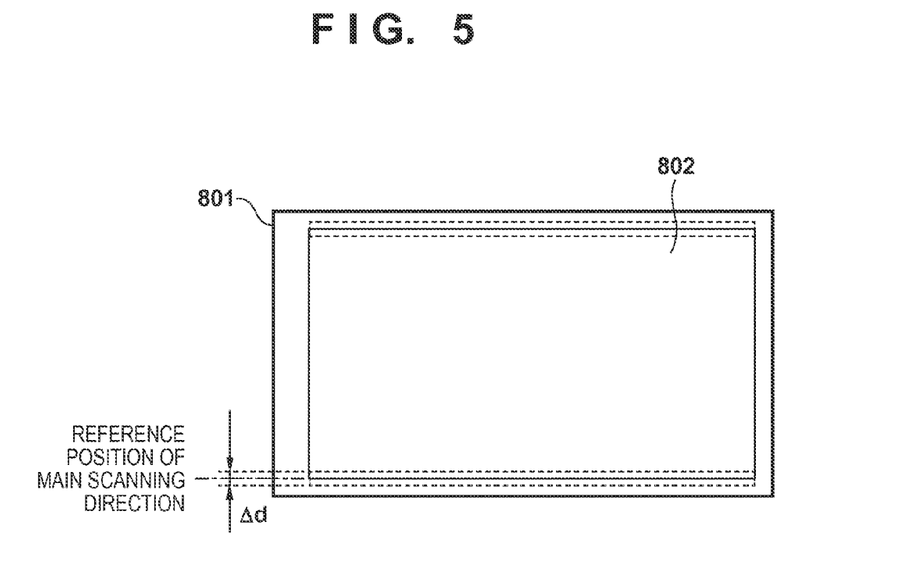
FIG. 5 is an explanatory diagram of a transfer position of a toner image to a sheet.

FIG. 5 illustrates a sheet 801, and reference numeral 802 denotes a toner image transferred according to the reference position in the main scanning direction. An amount of movement Δd of the intermediate transfer belt 128 in the main scanning direction is about several dozen μm at most, and there is no problem even if the color misregistration caused by the inclination of the intermediate transfer belt 128 is not corrected when a monochrome image is formed. However, even when a monochrome image is formed, the color misregistration correction control caused by the inclination of the intermediate transfer belt 128 can be performed in order to highly accurately adjust the transfer position on the sheet. Therefore, even when a monochrome image is formed, the color misregistration correction control caused by the inclination of the intermediate transfer belt 128 can performed if the required accuracy of the formation position of the image on the sheet is equal to or greater than a predetermined value.

Figure 6:
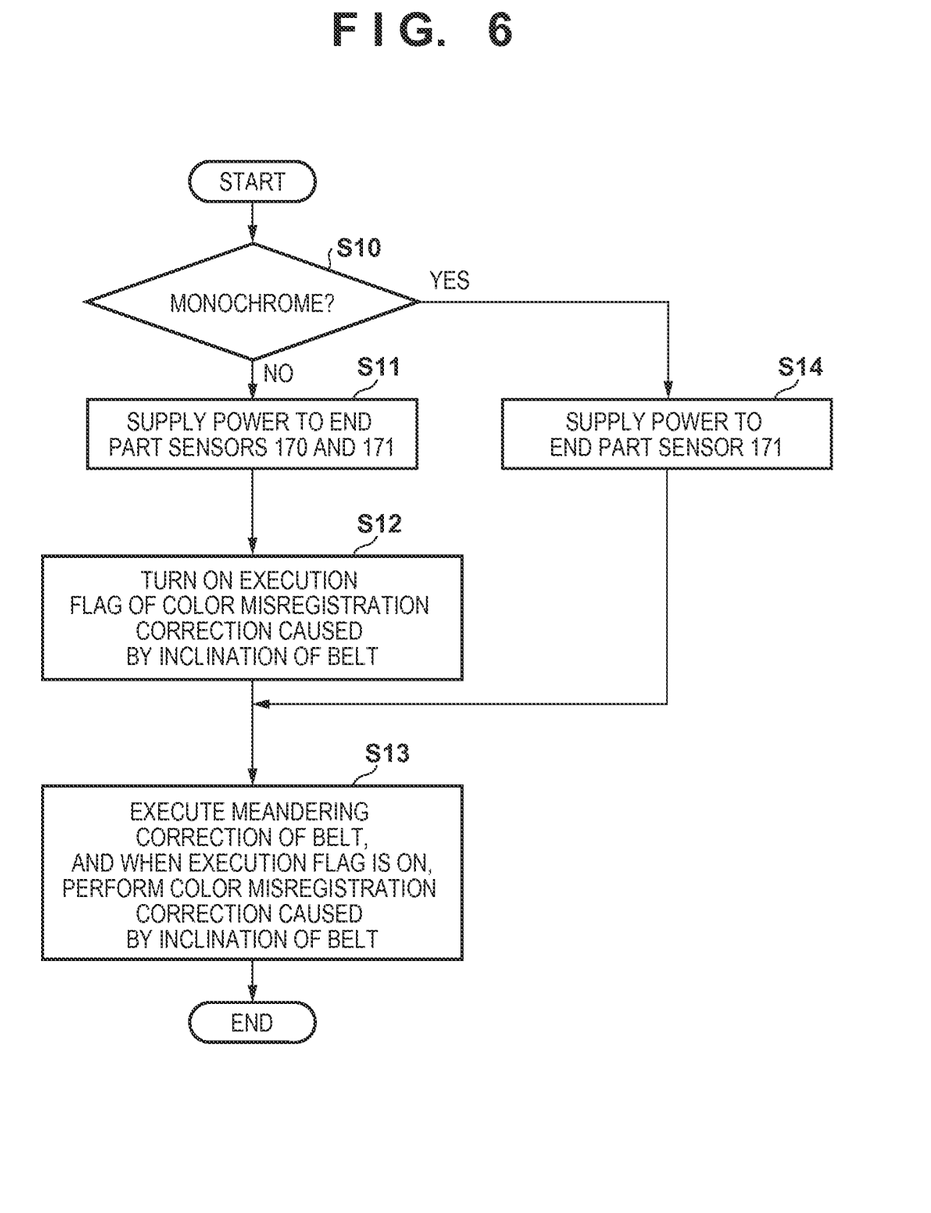
FIG. 6 is a flow chart of the color misregistration correction caused by the inclination of the intermediate transfer belt according to an embodiment.

FIG. 6 is a flow chart of the color misregistration correction control caused by the inclination of the intermediate transfer belt 128 relative to the rotation direction. The execution flag of the color misregistration correction is turned off in the initial state. When the image formation is started, the printer control unit 111 determines whether or not the image to be formed is monochrome in S10. If the image is not monochrome, the printer control unit 111 supplies power to the end part sensors 170 and 171 in S11 and turns on the execution flag of the color misregistration correction caused by the inclination of the intermediate transfer belt 128 in S12. On the other hand, if the image is monochrome, the printer control unit 111 supplies power only to the end part sensor 171 in S14. After the execution of S12 or S14, the printer control unit 111 drives to rotate the intermediate transfer belt 128, and performs a correction of the meandering of the belt in S13. When the execution flag is on, the color misregistration correction control caused by the inclination of the intermediate transfer belt 128 is performed.

As described, when the image to be formed is a monochrome image in the present embodiment, power supply to the member used only for the color misregistration correction caused by the inclination of the intermediate transfer belt 128 is stopped to stop the operation of the member. According to the configuration, the power consumption of the image forming apparatus can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-106460, filed on May 22, 2014, which is hereby incorporated by reference herein in its entirety.

What is claimed is:

1. An image forming apparatus comprising:
a transfer member that is driven to be rotated;
a first image forming unit configured to form a first image on the transfer member;
a second image forming unit arranged at a different position from that of the first image forming unit with respect to a rotation direction of the transfer member, and configured to form a second image on the transfer member;
a first detection unit configured to detect a first position of the transfer member in a direction perpendicular to the rotation direction;
a second detection unit arranged at a different position from that of the first detection unit with respect to the rotation direction of the transfer member, and configured to detect a second position of the transfer member in the direction perpendicular to the rotation direction; and
a control unit configured to control a forming position of the second image based on the first position and the second position to reduce a misregistration amount between the first image and the second image
wherein the control unit is further configured not to control the forming position of the second image when a monochrome image is formed.

2. The image forming apparatus according to claim 1, further comprising an adjustment unit configured to adjust inclination of the transfer member relative to the rotation direction based on the second position,
wherein when a monochrome image is formed, the second detection unit and the adjustment unit operate and the first detection unit does not operate.

3. The image forming apparatus according to claim 2, wherein the control unit is further configured to stop power supply to the first detection unit when a monochrome image is formed.

4. The image forming apparatus according to claim 1, further comprising a transfer unit configured to transfer an image formed on the transfer member to a sheet,
wherein the control unit is further configured to control the forming position of the second image even when a monochrome image is formed if required accuracy of the forming position of the second image on the sheet is equal to or greater than a predetermined value.

5. The image forming apparatus according to claim 1, further comprising an adjustment unit configured to adjust inclination of the transfer member relative to the rotation direction based on the second position,     wherein when a monochrome image is formed, the adjustment unit adjusts the inclination of the transfer member relative to the rotation direction.

6. The image forming apparatus according to claim 5, further comprising a transfer unit configured to transfer an image formed on the transfer member to a sheet,     wherein the transfer member is a belt, the adjustment unit is further configured to adjust an orientation of a roller that supports the belt, the position of the second detection unit is downstream of the position of the first detection unit and upstream of a position of the roller with respect to the rotation direction, and the position of the roller is upstream of the transfer unit.

7. The image forming apparatus according to claim 1, wherein the first detection unit and the second detection unit are further configured to detect an end part of the transfer member.

\* \* \* \* \*